Feb. 6, 1940.  D. Q. BLUNK  2,189,699

SLOPE GAUGE FOR GRADERS

Filed Jan. 23, 1939

Inventor
Daniel Q. Blunk.
By Orwig & Hague Attys

Patented Feb. 6, 1940

2,189,699

UNITED STATES PATENT OFFICE 2,189,699

SLOPE GAUGE FOR GRADERS

Daniel Q. Blunk, Fort Dodge, Iowa

Application January 23, 1939, Serial No. 252,239

1 Claim. (Cl. 33—220)

In the use of grading machines, and especially when used for road making purposes, it is desirable that on certain parts of the road being formed the degree of inclination from the horizontal be greater and on other parts less and on the road center horizontal.

The grading machines now in use are provided with means for adjusting the grade blade at various angles relative to the grader frame and its supporting wheels. Assuming that it is desired to form the outer edge of a roadway at a certain specified grade, then the blade is adjusted relative to the frame and wheel to the desired degree of angularity, and the grader is advanced. However, the paths upon which the wheels travel are not at any uniform level, hence, the blade is tilted at various angles during the advance of the grader. The operator adjusts the blade during its travel in an attempt to maintain the blade in position to form the desired grade, but with the equipment now in general use he must guess at the position to which the blade should be adjusted as the grader is advanced.

The object of my invention is to provide a slope gauge of simple, durable and inexpensive construction which may be readily and easily attached to or removed from a grader blade, located on the blade at a point where it may be easily seen by the operator and which will at all times visually indicate the exact slope which the blade will form as the grader advances.

More specifically, it is my object to provide a gauge of this class which will not be affected by the ordinary vibration of the grader when in use or the rapid tilting movements imparted to the blade when it passes over a stone or other small obstruction, so that the operator may, by glancing at the gauge, accurately determine the slope being formed and adjust the blade to bring it to position for forming the desired slope without having such vibrations and rapid tilting movements move the gauge to positions other than that of indicating the accurate slope of the roadway being formed by the grader.

Figures 2, 3:
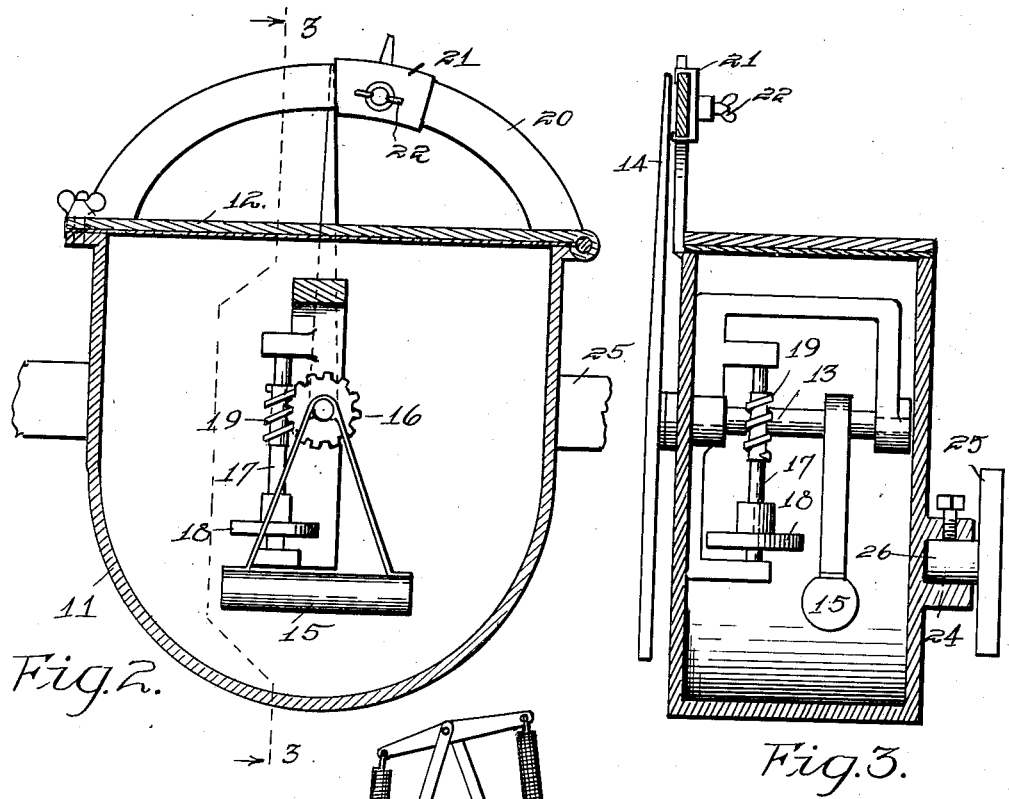
Figure 1:
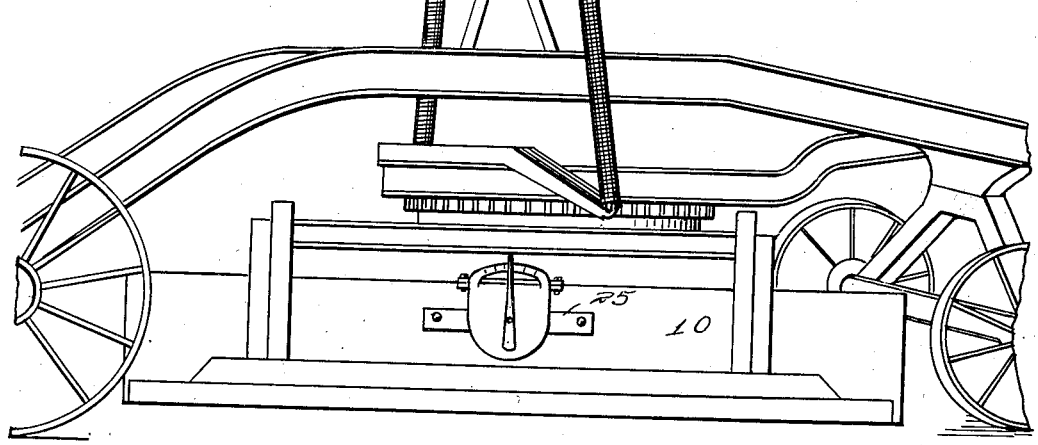

In the accompanying drawing Figure 1 shows a perspective view of a portion of a grader having my gauge applied to the blade thereof;

Figure 2 shows a vertical sectional view of my gauge taken on a line in the rear of the pendulum and looking toward the scale section; and Figure 3 is a vertical sectional view of same taken on a line at right angles to Figure 2.

The grading machine shown in the drawing is of the ordinary construction and has a blade 10 which may be tilted to various angles relative to the frame.

The slope gauge comprises an enclosed frame 11 provided with a hinged cover 12.

Within the frame there is a rotatable shaft 13 the front end of which is extended to a point in the rear of the frame, and an indicator hand 14 is fixed thereto.

Fixed to the rear portion of the shaft 13 is a pendulum 15, and fixed to the shaft 13 in front of the pendulum is a worm gear wheel 16.

At one side of the shaft 13 is a vertical rotatable shaft 17 having a weighted inertia disc 18 fixed thereto, and above the disc 18 there is a worm gear members 19 in mesh with the worm gear wheel 16.

Above the frame is a scale sector 20 adjacent the point of the indicator hand.

Slidingly mounted on the scale sector is an indicator finger 21 which may be adjusted on the scale sector to any desired position where it is frictionally held in place, or may be fixed by a set screw 22.

At the front of the frame is a socket 23 into which is detachably placed a lug 24 fixed to a bar 25 which is fixed to the rear face of the grader blade; a pin 26 is passed through the socket and lug to hold the lug in place.

In practical use the slope gauge is applied to the rear of the blade at a point where it may be easily seen by the operator seated upon the grader. Assuming that it is desired to form a grade of a specified slope, then the operator adjusts the blade to the desired slope, this will cause the indicator hand to move relative to the scale section and point to the scale mark indicating said slope, then the operator adjusts the movable indicator finger to a position in line with the indicator hand, then the grader is advanced over the roadway being graded. This frequently sets up severe vibrations of the blade. It also frequently happens that the blade passes over a stone or other obstruction, causing the blade to rapidly tilt away from its desired position and then rapidly return. Under such conditions, and if the pendulum and indicator were permitted to freely swing, then during ordinary operation of the grader the indicator hand would be in constant movement, hence, it would be of no value to the operator of the grader.

I have demonstrated in actual use that with my slope gauge such vibration and rapid tilting movements will not impart any movement to the indicator hand. With my slope gauge detached I can tilt it laterally by hand at an angle of 45° and back without imparting any movement to the indicator hand, due to the fact that the inertia weight disc and worm gearing tend to remain stationary and that it requires some time to overcome the inertia and move the indicator hand. This inertia weight and worm gearing does not in any way affect the accurate positioning of the indicator hand as it is normally operated by the pendulum except for the short period of time necessary to overcome the inertia of the transmitter to the weight through the worm gearing. Hence, in actual use the operator may glance at the indicator hand and indication finger and accurately determine at a glance just what slope is being formed and may adjust the blade to bring the indicator hand in line with the indicating finger as the grader is being advanced.

With the graders now in use the operator must guess at the angle of the slope being formed, and it is the common practice to correct improperly formed slopes by the use of hand tools, whereas with my slope gauge, this is unnecessary.

I claim as my invention:

A slope gauge for graders, comprising a casing, an indicator shaft mounted for rotation in the casing, a weighted pendulum fixed to the indicator shaft, an indicator hand fixed to the indicator shaft, an inertia shaft rotatably mounted in the casing at right angles to the indicator shaft, a worm gear fixed to the indicator shaft and a mating worm gear fixed to the inertia shaft, the relative proportions of the said worm gears being such as to greatly increase the speed of rotation of the inertia shaft relative to the indicator shaft, and the relative proportions of the weighted pendulum and the weighted inertia disc and the friction of the worm gears being such as to prevent movement of the indicator hand during the passage of a grade to which the indicator is applied over rough surfaces.

DANIEL Q. BLUNK.